United States Patent
Johnson et al.

(10) Patent No.: US 7,415,024 B2
(45) Date of Patent: Aug. 19, 2008

(54) SYSTEM AND METHOD OF ANNOTATING NETWORK PACKETS

(75) Inventors: Erik J. Johnson, Portland, OR (US);
Aaron R. Kunze, Portland, OR (US);
David M. Putzolu, Forest Grove, OR (US); Todd A. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1175 days.

(21) Appl. No.: 10/133,125

(22) Filed: Apr. 26, 2002

(65) Prior Publication Data

US 2003/0128717 A1    Jul. 10, 2003

Related U.S. Application Data

(60) Provisional application No. 60/346,696, filed on Jan. 7, 2002.

(51) Int. Cl.
*H04L 12/28* (2006.01)
*H04L 12/56* (2006.01)
*H04L 12/66* (2006.01)

(52) U.S. Cl. ............... 370/395.1; 370/355; 370/356; 370/389; 370/392; 370/400

(58) Field of Classification Search ............ 370/395.3
See application file for complete search history.

(56) References Cited

U.S. PATENT DOCUMENTS

| | | | |
|---|---|---|---|
| 6,307,789 B1 | 10/2001 | Wolrich et al. | |
| 6,381,242 B1 * | 4/2002 | Maher et al. | 370/394 |
| 6,430,155 B1 * | 8/2002 | Davie et al. | 370/232 |
| 6,529,520 B1 * | 3/2003 | Lee et al. | 370/442 |
| 6,584,522 B1 | 6/2003 | Wolrich et al. | |
| 6,614,791 B1 * | 9/2003 | Luciani et al. | 370/395.53 |
| 6,683,850 B1 * | 1/2004 | Dunning et al. | 370/231 |
| 6,744,777 B1 * | 6/2004 | Takatsuji et al. | 370/426 |
| 6,768,738 B1 * | 7/2004 | Yazaki et al. | 370/392 |
| 6,876,655 B1 * | 4/2005 | Afek et al. | 370/392 |
| 6,922,404 B1 * | 7/2005 | Narayanan et al. | 370/338 |
| 6,937,576 B1 * | 8/2005 | Di Benedetto et al. | 370/256 |
| 7,143,166 B1 * | 11/2006 | Brassil | 709/226 |
| 2002/0012348 A1 * | 1/2002 | Mizuhara et al. | 370/392 |
| 2002/0172155 A1 * | 11/2002 | Kasvand-Harris et al. | 370/229 |
| 2003/0043792 A1 * | 3/2003 | Carpini et al. | 370/386 |
| 2003/0115321 A1 * | 6/2003 | Edmison et al. | 709/224 |
| 2003/0145108 A1 * | 7/2003 | Joseph et al. | 709/239 |

OTHER PUBLICATIONS

RFC 3031—Multiprotocol Label Switching Architecture (URL: www.ietf.org, published Jan. 2001).*

XP-002248249, "Requirements for Separation of IP Control and Forwarding draft-ietf-forces-requirements-01.txt", Nov. 2001, 13 pages, IETF Draft.

(Continued)

*Primary Examiner*—Edan Orgad
*Assistant Examiner*—Blanche Wong
(74) *Attorney, Agent, or Firm*—Robert A. Greenberg

(57) ABSTRACT

A system and method of transmitting network packets between network processing elements through links are disclosed. One or more configuration entities may allocate one or more fixed length slots to be appended to network packets forwarded on a link between network processing elements in-band of the link.

11 Claims, 4 Drawing Sheets

OTHER PUBLICATIONS

XP-002248249, "ForCES Architectural Framework and FE Functional Model", Nov. 2001, 22 pages, IETF Draft.
XP-002248251, "ForCES Applicability Statement", Feb. 28, 2002, IETF Forces WG Draft, 10 pages.
Int'l Application No.: PCT/US03/12352 Written Opinion dated Jun. 26, 2006.
Johnson et al.: IXP1200 Programming, The MicroEngine Coding Guide for the Intel Network Processor Guide; Intel Press.

* cited by examiner

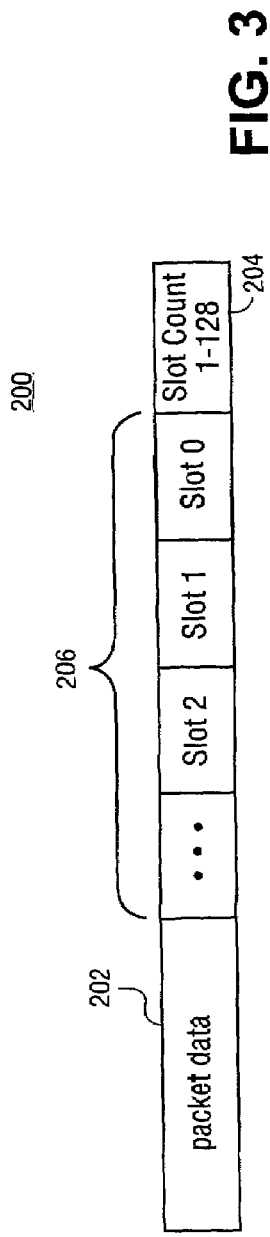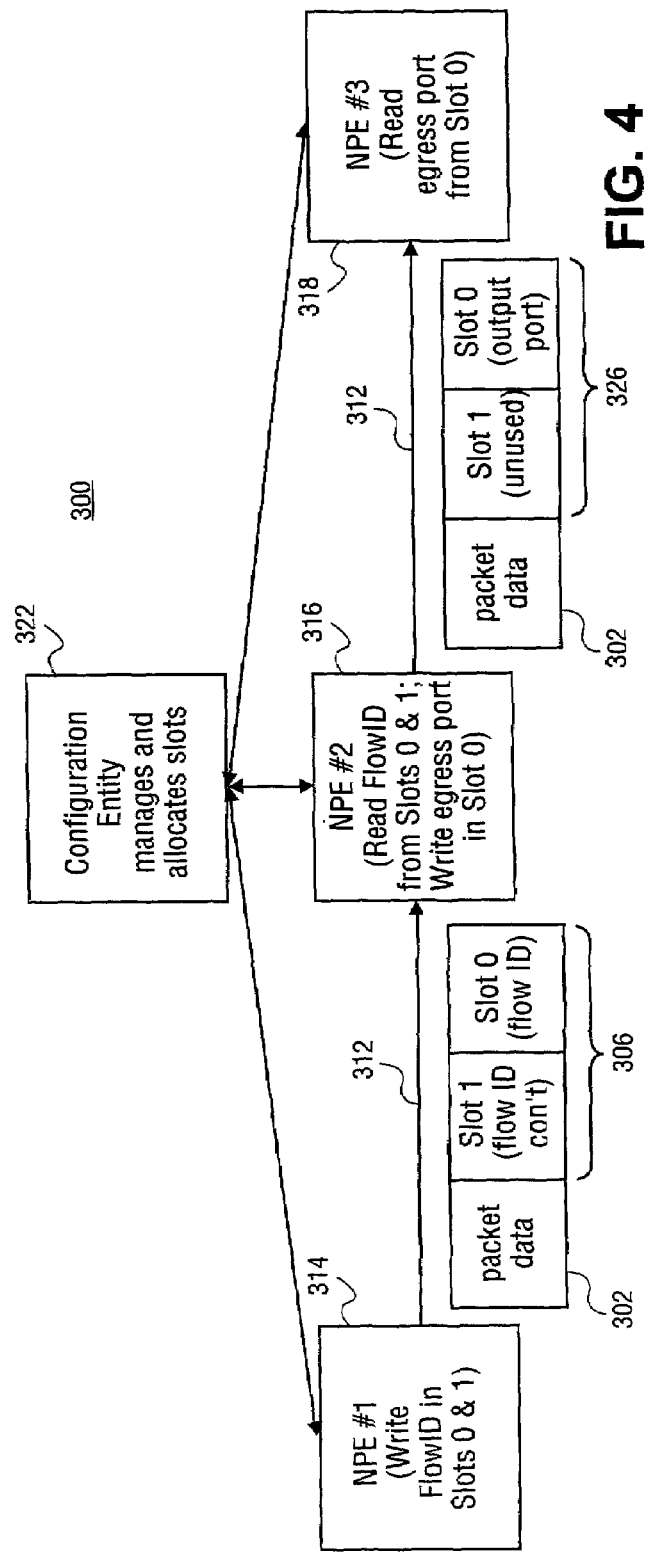

SYSTEM AND METHOD OF ANNOTATING NETWORK PACKETS

This application claims the benefit of U.S. Provisional Patent Appl. No. 60/346,696, filed on Jan. 7, 2002, under 35 U.S.C. § 119 (e).

BACKGROUND

1. Field

The subject matter disclosed herein relates to the processing of network packets. In particular, the subject matter disclosed herein relates to processing network packets in a network processing environment.

2. Information

Network routers typically employ network processing elements to process network packets received at ingress communication ports for forwarding to egress communication ports according to one or more network policies. A router may comprise multiple network processing elements that transmits network packets through links coupling the network processing elements. For example, a first network processing element may classify a received network packet and then forward the network packet to a second network processing element. The second network processing element may then associate an egress port with the network packet. In conjunction with forwarding network packets from one network processing element to another in a router, individual network processing elements may forward control information on a per-packet basis (e.g., meta data or control information representative of a classification or egress port number).

Network processing elements—such as network processors, classification, traffic management, security, and accounting co-processors, or even software modules within a single processor—within a single network element (e.g., a router), typically employ some form of per-packet communication to efficiently process packets. For example, in a multi-blade chassis-based router, where each blade contains a classification co-processor and a network processor, the classification co-processors typically communicate the result of each packet's classification (e.g., a flow ID) to a corresponding network processor. The network processor typically then marks and polices the packet. Similarly, for any packet arriving on one blade and destined for a port on another blade, the ingress network processor typically communicates the outgoing port number to an egress network processor.

To communicate control information or meta data on per-packet basis, one solution is to annotate each packet with the desired information. This annotation is typically done by prepending or appending the packet with the appropriate meta data or control information. For example, in a multi-blade chassis-based router, a classifier co-processor typically prepends flow ID information on each packet before forwarding the packet to a network processor. The network processor could then extract the flow ID and subsequently prepend the outgoing port number before forwarding the packet to an egress network process across the backplane of a chassis.

Simply prepending packet annotations does not, however, address providing type identification. Two common solutions are to use either a self-identifying list of annotations or a fixed-format list of annotations. To create a self-identifying list of annotation, each annotation in the list typically contains a canonical type and a length field along with the actual value of the annotation. This so-called type-length-value (TLV) approach has the property of being self-identifying since each annotation can be fully identified by the type field. New annotations can be added because the length field allows older network processing elements to ignore unknown types. Fixed-format list of annotations typically determine a canonical position in the list for each possible type of information communication. No type or length information may be required because each of the network processing elements agrees on the single fixed-format.

TLV annotations, while flexible, are not efficient to process or transmit. TLV annotations are not efficient to process because they require a linear search of the annotation list to find the particular annotations (types) of interest. Moreover, the entire TLV list must be completely searched to find the start of the actual packet data. TLV annotations are not efficient to transmit because the type and length fields occupy bandwidth. If the representation of the actual values is small compared to the type and length fields, considerable bandwidth would be devoted to the transmission of the type and length fields.

Fixed-format annotations, while efficient to process, are not necessarily efficient to transmit and are also not flexible. With transmission of fixed-format annotations, there is the potential of transmitting unused fields. If, for example, two network processing elements only share one type of information, they still must transmit all of the fixed-format fields, including the unused fields. One solution would be to configure the communication between each pair of network processing elements with its own unique fixed-format. While this would solve the transmission inefficiency, it imposes a processing inefficiency and, worse yet, is intractable for ASIC-based networking processing elements.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

FIG. 3 shows a format of slotted annotations for in-band per-packet communication according to an embodiment of the node shown in FIG. 2.

FIG. 4 illustrates an allocation of slots in links according to an embodiment of the present invention as illustrated in FIG. 3.

DETAILED DESCRIPTION

Figure 1:
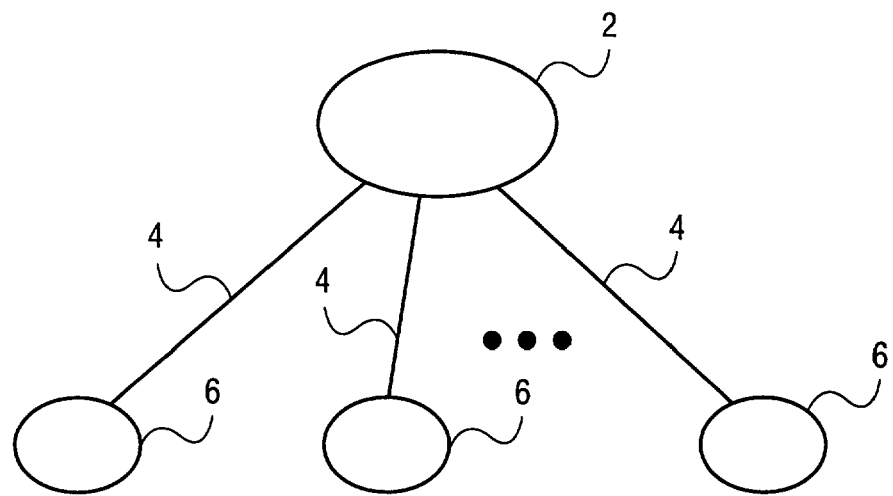
FIG. 1 shows a network topology according to an embodiment of the present invention.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Machine-readable" instructions as referred to herein relates to expressions which may be understood by one or more machines for performing one or more logical operations. For example, machine-readable instructions may comprise instructions which are interpretable by a processor compiler for executing one or more operations one or more data objects. However, this is merely an example of machine-readable instructions and embodiments of the present invention are not limited in this respect.

"Storage medium" as referred to herein relates to media capable of maintaining expressions of data. For example, a storage medium may comprise one or more storage devices for storing data or machine-readable instructions in a particular format. Such storage devices may comprise devices capable of maintaining expressions of data in media such as, for example, magnetic, optical or semiconductor media. However, these are merely examples of storage media and embodiments of the present invention are not limited in these respect.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Also, logic may comprise machine-executable instructions stored in a memory in combination with processing circuitry to execute such instructions. However, these are merely examples of structures which may provide logic and embodiments of the present invention are not limited in these respects.

A "processing system" as discussed herein relates to a combination of hardware and software resources for accomplishing computational tasks. However, this is merely an example of a processing system and embodiments of the present invention are not limited in this respect. A "host processing system" relates to a processing system which may be adapted to communicate with a "peripheral device." For example, a peripheral device may provide inputs to or receive outputs from an application process hosted on the host processing system. However, these are merely examples of a host processing system and a peripheral device and embodiments of the present invention are not limited in these respects.

A "data bus" as referred to herein relates to circuitry for transmitting data between devices. For example, a data bus may transmit data between a host processing system and a peripheral device. However, this is merely an example of a data bus and embodiments of the present invention are not limited in this respect. A "bus transaction" as referred to herein relates to an interaction between devices coupled in a bus structure wherein one device transmits data addressed to the other device through the bus structure.

A "transmission medium" as referred to herein relates to any media suitable for transmitting data. A transmission medium may include any one of several mediums including, for example, copper transmission media, optical transmission media or wireless transmission media. Also, a transmission medium may comprise combinations of two or more of the aforementioned media. However, these are merely examples of transmission media and embodiments of the present invention are not limited in these respects.

A "communication port" as referred to herein relates to circuitry to transmit data to or received data from a transmission medium. For example, a communication port may comprise circuitry to transmit data to or receive data from a transmission medium according to a data transmission protocol. However, this is merely an example of a communication port and embodiments of the present invention are not limited in this respect.

An "ingress" communication port as referred to herein relates to a communication port to receive data from a transmission medium according to a data transmission protocol. For example, an ingress communication port may be associated with a network address and receive formatted data from a transmission medium associated with the network address. However, this is merely an example of an ingress communication port and embodiments of the present invention are not limited in this respect.

An "egress" communication port as referred to herein relates to a communication port to transmit data through a transmission medium toward a destination. For example, an egress communication port may transmit formatted data through a transmission medium toward a destination associated with a network address. However, this is merely an example of an egress port and embodiments of the present invention are not limited in this respect.

A "network packet" as referred to herein relates to a unit of data to be transmitted to a destination according to a network protocol. A network packet may comprise a payload portion and a header portion. The payload portion may comprise data to be transmitted to a network destination. The header portion may comprise data indicative of a source or destination network address. However, these are merely examples of a network packet and embodiments of the present invention are not limited in this respect.

A "link" as referred to herein relates to circuitry to transmit data between devices. A link may provide point to point communication between two devices either unidirectionally or bi-directionally. A link may transmit data between the devices independently of address information. However, these are merely examples of a link and embodiments of the present invention are not limited in these respects.

A link may transmit data including network packets between devices in a transmission medium. In addition to the network packet data, a link may interleave other data to be transmitted between the devices "in-band" with the network packet data. For example, the transmission of such other data in the link may be time multiplexed with the transmission of network packet data between the device. However, this is merely an example of in-band data transmission and embodiments of the present invention are not limited in these respects.

A "slot" as referred to herein relates to a discrete resource of a link for transmitting data. For example, a slot may comprise a discrete quantity of time for transmission of data in a link. Alternatively, a slot may comprise a discrete and contiguous quantity of data to be transmitted in a link. However, these are merely examples of a slot and embodiments of the present invention are not limited in these respects.

A "fixed length slot" as referred to herein relates to a slot having a predetermined size according to a uniform fixed length for slots to be transmitted in a link. For example, a fixed length slot may be associated with a predetermined transmission interval in the link or a predetermined number of bits. However, these are merely examples of "fixed length slots" and embodiments of the present invention are not limited in these respects.

"Control information" or "meta data" as referred to herein relates to information that may be associated with a network packet transmitted in a link. For example, meta data or control information may be appended to network packets transmitted in a link. However, this is merely an example of meta data and embodiments of the present invention are not limited in this respect.

Meta data may be associated with one or more "meta data types" defining how the meta data appended to a network packet is to be interpreted. Meta data appended to a network packet may be associated with meta data types such as, for example, FlowID information, classification information or an egress port identifier. However, these are merely examples of meta data types that may be associated with meta data appended to a network packet transmitted in a link and embodiments of the present invention are not limited in these respects.

A "network processing element" as referred to herein relates to a device to process information in, or information associated with, network packets. A network processing element may comprise programmable logic or hardwired logic to process the information in or associated with the network packets. In one application, a network processing element may draw inferences regarding network packets based upon information in or information associated with the network packets. For example, a network processing element may comprise logic to provide classification information or flow information to be associated with network packets. In other applications, a network processing element may encrypt, compress or reorder network packets that are to be forwarded to a destination. However, these are merely examples of network processing elements and embodiments of the present invention are not limited in these respects.

A "configuration entity" as referred to herein relates to a process or logic to manage communication between devices through a link. For example, a configuration entity may allocate portions of a link for transmitting meta data or control information between devices in-band of the link. The configuration entity may identify a size for the allocated portions and identify the type of meta data or control information to be transmitted in the allocated portions. However, this is merely an example of a configuration entity and embodiments of the present invention are not limited in this respect.

A network processing system may define multiple "planes" of processing. A plane may associate processing objects according to their relevance in a layered processing stack (e.g., layers in a network processing system or device driver). Each plane may define an application programming interface (API) comprising routines or protocols for building software applications. For example, a network processing system may define a "control plane" and a "data plane" comprising processing objects providing one or more APIs. For example, a data plane may comprise processing objects to perform data packet classification and forwarding tasks. A control plane may comprise processing objects to perform exception handling for processing objects in the data plane. However, these are merely examples of how a network processing system may define multiple planes of processing objects and embodiments of the present invention are not limited in these respects.

Briefly, an embodiment of the present invention relates to a system and method of transmitting network packets between network processing elements through links. One or more configuration entities may allocate one or more fixed length slots to be appended to network packets forwarded on a link between network processing elements in-band of the link. In transmitting a network packet to a destination network processing element, a network processing element may append control information to the network packet in the allocated fixed length slots. However, this is merely an example embodiment and other embodiments are not limited in these respects.

FIG. 1 shows a network topology according to an embodiment of the present invention. A node 2 is coupled to a plurality of nodes 6 through transmission medium 4 to transmit network packets to or receive network packets from the nodes 6 according to a network protocol. A node 6 may transmit network packets through the transmission medium 4 to an ingress communication port (not shown) of the node 2. Based upon information in the received data packet, the node 2 may then forward the received data packet to another node 6 through an egress communication port (not shown). Any of the nodes 6 may be a source or destination for network packets received at an ingress communication port of the node 2. However, this is merely an example of a communication network and embodiments of the present invention are not limited in this respect.

The transmission medium 4 may comprise any one of several transmission mediums capable of transmitting information including, for example, copper or optical cabling, or wireless transmission media. However, these are merely examples of transmission media and embodiments of the present invention are not limited in these respects.

Figure 2:
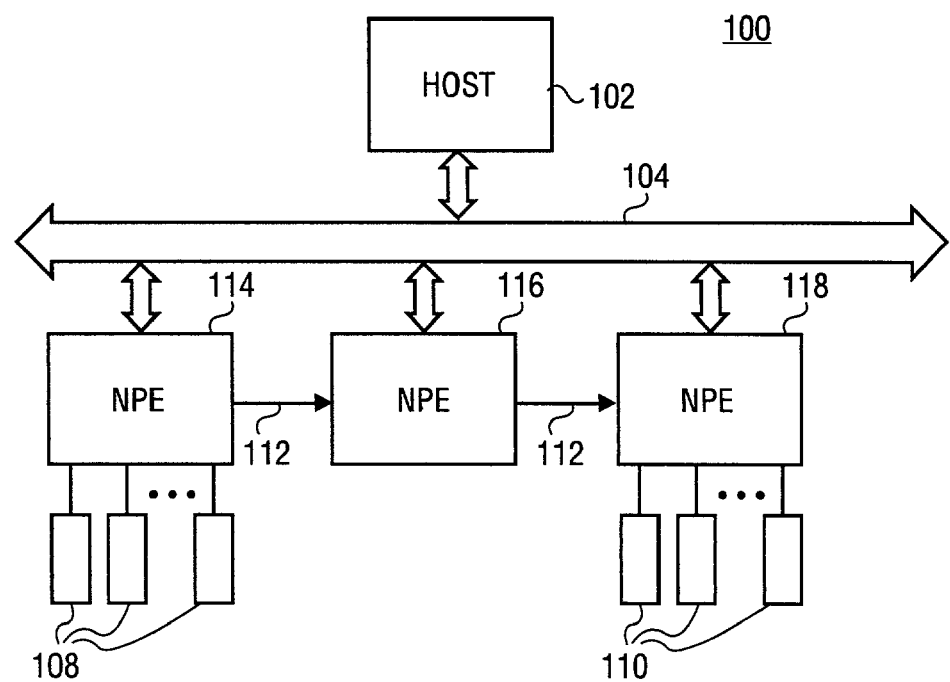
FIG. 2 shows a schematic diagram of a node in a network according to an embodiment of the network topology shown in FIG. 1.

FIG. 2 shows a schematic diagram of a node in a network according to an embodiment of the network topology shown in FIG. 1. A processing platform 100 comprises a host processing system 102 coupled to a plurality of network processing elements (NPEs) 114, 116 and 118 through a data bus 104. The host processing system 102 may comprise a central processing unit (CPU) (not shown) and system memory (not shown) to host an operating system and application programs. The NPE 114 may be coupled to a plurality of ingress communication ports 108 to receive network packets from a transmission medium from source nodes. The NPE 118 may be coupled to a plurality of egress communication ports to transmit network packets through a transmission medium to destination nodes. However, this is merely an example of a node in a network and embodiments of the present invention are not limited in this respect.

The ingress and egress communication ports 108 and 110 may transmit data to or receive data from a node through a transmission medium according to any one of several data link layer communication protocols. For example, such a link layer protocol may include any one of the Ethernet, SONET, ATM, frame relay, token ring or point-to-point protocols. However, these are merely examples of data link layer protocols that may be used for transmitting network packets to or receiving network packets from a communication node and embodiments of the present invention are not limited in this respect.

In the presently illustrated embodiment, the NPEs 114, 116 and 118 may analyze the contents of a network packet received from the ingress communication ports 108 and make inferences regarding the network packet. Such an NPE may associate meta data or control information with a network packet which is representative of such an inference. For example, the NPE may associate meta data with a network packet that is representative of a packet classification, a flow identifier or an output egress communication port. Also, the NPE may associate meta data with a network packet that is based upon the origin of the packet to determine how the packet is treated (e.g., a UserID that is used to determine a priority for forwarding the packet according to a quality of service scheme). In another example, a NPE may determine that a network packet is associated with a particular data flow/connection that requires encryption and associate meta data including an encryption key to be used to encrypt the data at a subsequent NPE. However, these are merely examples of meta data that may be associated with network packets by an NPE and embodiments of the present invention are not limited in these respects. Alternatively, an NPE may initiate an action to process a network packet based upon meta data associated with the network packet. For example, the NPE 118 may initiate transmission of a network packet on a particular egress communication port 110 for transmitting network packet based upon meta data associated with the network packet.

The NPEs 114, 116 and 118 may comprise any one of several devices to provide or process meta data to be associated with network packets. For example, an NPE may comprise any one of several programmable network processor devices such as the IXP 1200 network processor sold by Intel Corporation. Alternatively, an NPE may comprise any one of several non-programmable or semi-programmable application specific integrated circuit (ASIC) devices for analyzing network packets and providing meta data to be associated with the network packets. However, these are merely examples of devices which may be used as NPEs and embodiments of the present invention are not limited in these respects.

Links 112 are coupled between the NPEs 114, 116 and 118 to transmit network packets among the NPEs. In the presently illustrated embodiment, the links 112 may transmit network packets received from the ingress communication ports 108 from the NPE 114 to the NPE 116, and from the NPE 116 to the NPE 118. Network packets received at the NPE 118 from a link 112 may then be transmitted to a destination node through an egress communication port 110. The links 112 may comprise any one of several transmission media capable of transmitting network packets between devices according to data transmission protocol. For example, the links 112 may comprise a UTOPIA bus or versions of the System Packet Interface (SPI) link defined by the Optical Internetworking Forum (OIF) to transmit data between NPEs. However, these are merely examples of a link to transmit data between devices and embodiments of the present invention are not limited in these respects.

The node 100 may comprise separate processing blades disposed within a chassis (not shown) where each NPE resides on a blade coupled to the data bus 104. However, this is merely an example of how NPEs may be disposed in a node and embodiments of the present invention are not limited in this respect.

While the embodiment illustrated in FIG. 2 shows the node 100 comprising three NPEs 114, 116 and 118, it should be understood that the embodiments illustrated throughout may also apply to other nodes having two, or more than three NPEs coupled in series by links to process network packets received on ingress ports to be forwarded to egress ports.

According to an embodiment, the NPEs 114 and 116 may append meta data to network packets transmitted in the links 112 in fixed length time slots. The number of slots and the format of each slot in a link 112 may be determined by a configuration entity (not shown). FIG. 3 illustrates an allocation of fixed length slots 204 and 206 to be appended to a network packet 202 transmitted in a link 112 between NPEs. The slots 204 and 206 may be of any pre-determined length (e.g., eight bits). The slots 204 may comprise meta data associated with the network packet 202. The configuration entity may fix the number of slots 206 to be appended to each network packet forwarded in a link 112 between NPEs. However, this is merely an example of how a configuration entity may define how slots are allocated in a link for transmitting network packets between NPEs. Alternatively, the number of slots 206 containing meta data may be dynamically allocated using a slot 204 to indicate the number of slots 206 being appended to each network packet forwarded in the link 112.

In addition to determining a number of slots to be appended to a network packet, the configuration entity may also define a type of meta data ("meta data types") for the data to be placed in each of the allocated slots. For example, the configuration entity may pre-define some allocated slots to contain classification information or an egress communication port number. However, this is merely an example of how a configuration entity may define meta data types for data to be provided within allocated slots and embodiments of the present invention are not limited in this respect.

According to an embodiment, instead of, or in addition to, indicating a number of slots being appended, information in slot 204 may indicate a meta data type associated with the meta data to be provided in the one or more slots 206. For example, slot 204 may contain a value 0×01 to indicate that the following two slots 206 are to provide a sixteen bit FlowID immediately followed by the packet data 202. Similarly, slot 204 may contain a value 0×02 to indicate that the following slot 206 provides an egress port number immediately followed by the packet data 202. However, these are merely examples of how an appended slot may indicate meta data types of meta data to be appended in other slots and embodiments of the present invention are not limited in these respects.

FIG. 3 shows slots 206 and 204 being appended to the beginning of packet data 202 as it is forwarded between NPEs on a link 112. It should be understood, however, that in alternative embodiments slots containing meta data may be append to the end of network packet data instead of the beginning of the network packet data.

According to an embodiment of the node illustrated with reference to FIG. 2, a configuration entity may comprise a process that is executed by the host processing system 102. Upon execution, this configuration entity may allocate fixed length slots to be appended in-band to the network packets transmitted between NPEs through the links 112. For example, the host processing system 102 may execute the configuration entity in response to a reset event to initiate one or more bus transactions on the data bus 104 addressed to one or more NPEs. The bus transactions may transmit data indicating a format for appending fixed length slots to network packets as illustrated in FIG. 3. The data provided in the bus transactions may include, for example, the size of slots, a number of allocated fixed length slots and meta data types to define meta data to be provided in the fixed length slots. Also, the configuration entity may reside as a process in a "control plane" which controls processes residing in a "data plane" residing on the NPEs. However, this is merely an example of how a configuration entity may be implemented in a node and embodiments of the present invention are not limited in these respects.

FIG. 4 illustrates how a configuration entity 322 may allocate fixed length slots to be appended to network packets transmitted between NPEs on links 312 according to an embodiment of the present invention as illustrated above with reference to FIGS. 2 and 3. An NPE 314 may receive network packets from an ingress communication port (not shown) and determine meta data such as a "FlowID" based upon an analysis of the data in the received network packets. For example, the NPE 314 may associate each received network packet with a packet classification and assign a FlowID to the network packet based upon the associated packet classification. Such classification information may include, for example, a 5-tuple comprising a source IP address, destination IP address, protocol number (to indicate a type of traffic being transmitted), source port number (e.g., indicating a source entity sending the network packet) and destination port number (e.g., indicating a destination entity to receive the network packet). Alternatively, such classification information may include a 5-tuple or combination of one or more of the aforementioned 5-tuple fields with other fields such as a DS byte to indicate a quality of service to be associated with the network packet. However, these are merely examples of classification information that may be associated with a network packet and embodiments of the present invention are not limited in these respects.

The NPE 314 may determine FlowID information based upon other types of packet inspection. For example, the NPE 314 may associate FlowID information based upon network packet content. In a particular example, NPE 314 may associate network packets from an on-line shopper with a higher priority if the on-line shopper has made purchases in the past and is therefore likely to make purchases in the future (e.g., unlikely to be a mere browser or "window shopper"). Thus, if NPE determines (from examining the contents of a network packet) that the on-line shopper has selected an item for purchase (e.g., completed payment or added an item to a "shopping cart"), subsequent network packets may be forwarded with a higher priority. However, this is merely an example of how FlowID information may be based upon network packet content and embodiments of the present invention are not limited in this respect.

The NPE 314 may append the FlowID to the network packet 302 in slots 306 for forwarding to an NPE 316 for further processing. The NPE 316 may then determine other meta data such as an egress communication port number based upon the FlowID in the slots 306, and append the egress communication port number in slots 326 to be appended to the network packet 302 for forwarding to an NPE 318. The NPE 318 may then initiate transmission of the network packet on an egress communication port associated with the egress communication port number.

In the presently illustrated embodiment, a configuration entity 322 may determine the number of slots to be appended to the network packet in-band in each link 312 between NPEs, and length/size of each individual slot. The configuration entity 322 may determine a maximum requirement for slots to transmit meta data with network packets in a link, and allocate a fixed number of slots for each link 312 that is sufficient to meet this maximum requirement. In the presently illustrated embodiment, for example, FlowID information to be appended to network packets transmitted from NPE 314 to NPE 316 provides a maximum requirement of two slots. Accordingly, the configuration entity 322 allocates two slots to be appended in-band when transmitting a network packet in a link 312 between NPE 314 and NPE 316, and between NPE 316 and NPE 318. Since an egress communication port number can be transmitted in a link 312 with only one slot, one of the allocated slots for transmitting network packets between NPE 316 and NPE 318 may remain unused.

Figure 5:
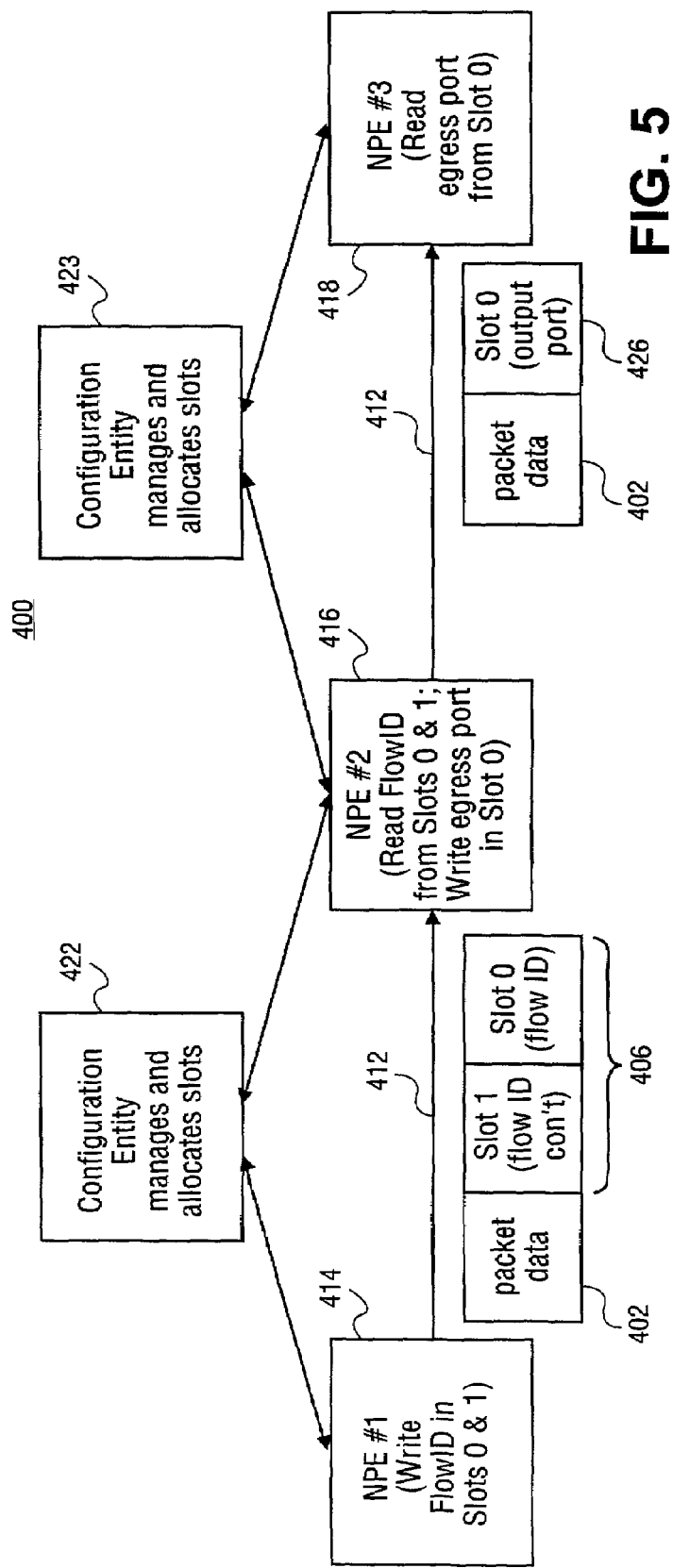
FIG. 5 illustrates an allocation of slots in links according to an alternative embodiment of the present invention as illustrated with reference to FIG. 3.

In an alternative to the embodiment illustrated with reference to FIG. 4, FIG. 5 illustrates an embodiment with two configuration entities 422 and 423. The configuration entity 422 may allocate slots to append FlowID information to network packets 402 in-band (when forwarding the network packet 402 from the NPE 414 to the NPE 416) while configuration entity 423 may independently allocate slots to append an egress communication port number to network packets 402 in-band (when forwarding the network packet 402 from the NPE 416 to the NPE 418). Accordingly, the configuration entity 423 may avoid allocation of unused slots for appending the egress communication port number to the network packets 402 forwarded to the NPE 418.

In the embodiments illustrated above with reference to FIGS. 4 and 5, the configuration entities 322, 422 and 423 may define allocated slots to be appended in-band when transmitting network packets between NPEs according to a predetermined slot allocation. Alternatively, the configuration entities 322, 422 and 423 may query the NPEs, and then negotiate an allocation of slots for meta data to be appended to network packets forwarded between NPEs. The negotiated allocation of slots in a link may be selected from a plurality of allocations which are compatible with NPEs coupled by the link. For example, a configuration manager may identify potential allocation schemes which are compatible among all affected NPEs, and select the most efficient allocation among the common compatible allocation scheme. The configuration manager may then define data types for data to be provided in the allocated slots, and transmit messages to the NPEs to communicate to the affected NPEs the allocation of fixed length slots and the meta data types for data to be provided in the allocated slots. However, this is merely an example of a negotiated allocation of slots among multiple NPEs and embodiments of the present invention are not limited in this respect.

Figure 6:
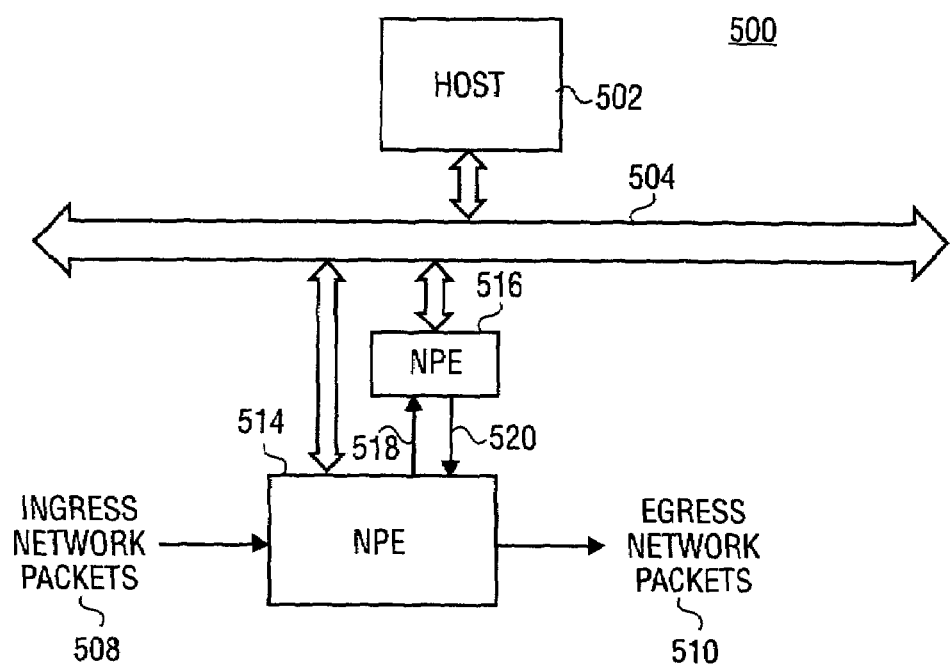
FIG. 6 shows an alternative embodiment of the present invention directed to off-loading processing from a first network processing element to a second network processing element.

FIG. 6 shows an alternative embodiment in which a node 500 comprises a master NPE 514 and a slave NPE 516. The master NPE 514 may process ingress network packets 508 received from a network packet source such as one or more ingress communication ports (not shown) or an ingress NPE (not shown). The NPE 514 may then provide egress network packets 510 to a destination (e.g., one or more egress communication port or an egress NPE) based upon the processed ingress network packets 508. In processing the ingress network packets 508, the master NPE 514 may communicate with the slave NPE 516 through links 518 and 520 to off-load processing.

The links 518 and 520 may transmit data in fixed length slots between the NPEs 514 and 516. The master NPE 514 may off-load the processing of ingress network packets 508 by copying data from selected fields of the ingress network packets 508 into fixed length slots of the link 518. For example, the master NPE 514 may automatically forward a fixed number of leading bytes from each network packet to the slave NPE 516 on link 518. In response to processing information received on the link 518, the slave NPE 516 may return information to the master NPE 514 on the link 520 in fixed length slots. The information returned on the link 520 may include meta data such as, for example, classification information. The slave NPE 516 may return other meta data on the link 520 such as an egress port number or Ethernet destination address according to an IPv4 forwarding scheme based upon a destination IP address provided by the master NPE 514 on the link 518.

The slave NPE 516 may return the meta data returned in slots on the link 520 in association with particular ingress packets 508 received at the master NPE 514. For example, in addition to data copied from selected fields in ingress network packet 508, the fixed length slots may include identification data associated with the copied data. The slave NPE 516 may then include the identification data in slots on the link 520, enabling the master NPE 514 to associated the received meta data with particular received ingress network packets 508.

In the presently illustrated embodiment a configuration entity (not shown) may allocate fixed length slots on the 518 and 520 links. The configuration entity may be hosted on a host processing system 502 to be executed in response to a reset event. The configuration entity may initiate bus transactions on the data bus 504 addressed to the NPEs 514 and 516. In one embodiment, the configuration entity may define the format of slots on the links 518 and 520 according to a predetermined scheme. Alternatively, the configuration entity may query the NPEs 514 and 516, and then negotiate a slot format on the links 518 and 520 based upon responses from the NPEs 514 and 516 to the initial query.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method, comprising:
   allocating respective fixed length slots to different respective types of packet meta data; and
   distributing packet meta data type information characterizing the allocation of the fixed length slots to (1) enable at least a first network processing element to identify values of packet meta data in the fixed length slots included with subsequent packets received by the first network processing element based on the packet meta type information; and (2) enable at least a second network processing element to store values of packet meta data in the fixed length slots included with subsequent packets transmitted by the second network processor element based on the packet meta type information.

2. The method of claim 1, wherein the types of packet meta data comprise a packet flow id.

3. The method of claim 1, wherein the types of packet meta data comprises an output port.

4. The method of claim 1, wherein the fixed length slots comprise slots appended to a network packet.

5. The method of claim 1, wherein the fixed length slots comprise slots pre-pended to a network packet.

6. The method of claim 1, wherein the types of packet meta data comprise at least one type derived from the contents of a network packet.

7. The method of claim 1, further comprising allocating the same fixed length slot positions to different types of packet meta data for transmission between different respective network processing elements.

8. A method, comprising:
   receiving, at a first network processing element from a configuration entity, first meta data type information characterizing allocation of fixed length slots to different types of packet meta data;
   receiving, at the first network processing element from a second network processing element, a network packet with values of packet meta data stored in the allocated fixed length slots; and
   identifying, at the first network processing element, values of packet meta data stored in the allocated fixed length slots based on the first meta data type information received from the configuration entity.

9. The method of claim 8, further comprising:
   receiving, at the first network processing element from the configuration entity, second meta data type information characterizing allocation of fixed length slots to different types of packet meta data; and
   storing meta data, at the first network processing element, in fixed length slots included with subsequent network packets sent by the first network processing element based on the second meta data type information received from the configuration entity.

10. The method of claim 8, wherein the types of packet meta data comprises at least one of: a packet flow id type and an output port type.

11. The method of claim 8, wherein the fixed length slots comprise at least one of: slots appended to a network packet and slots pre-pended to a network packet.

* * * * *